United States Patent [19]

Pegram

[11] Patent Number: 4,487,998
[45] Date of Patent: Dec. 11, 1984

[54] RELEASABLE GROMMET

[75] Inventor: Warren J. Pegram, Greensboro, N.C.

[73] Assignee: AMP Incorporated, Harrisburg, Pa.

[21] Appl. No.: 517,617

[22] Filed: Jul. 27, 1983

[51] Int. Cl.$^3$ .......................... H01B 17/26; F16L 5/00
[52] U.S. Cl. .................................. 174/153 G; 248/56
[58] Field of Search ............ 174/65 G, 152 G, 153 G; 16/2; 29/426.6; 248/56; 277/178; 339/103 B, 126 RS, 128

[56] References Cited
FOREIGN PATENT DOCUMENTS
535041 2/1955 Belgium ............................ 174/65 G

*Primary Examiner*—Laramie E. Askin
*Attorney, Agent, or Firm*—Robert W. J. Usher

[57] ABSTRACT

A grommet having a body of resilient material formed with a laterally extending mounting flange axially spaced from a laterally extending detent shoulder for securing the grommet in an aperture in a panel received between the mounting flange and detent shoulder and an axially extending socket adjacent the detent shoulder for receipt of a lever-form release tool between a cable anchored by the grommet and the detent shoulder. The socket opens to a front face of the body adjacent the mounting flange and a stress-relieving cavity is formed in the rear face of the body between the socket and the grommet axis. The grommet may be formed by moulding directly onto a cable.

7 Claims, 3 Drawing Figures

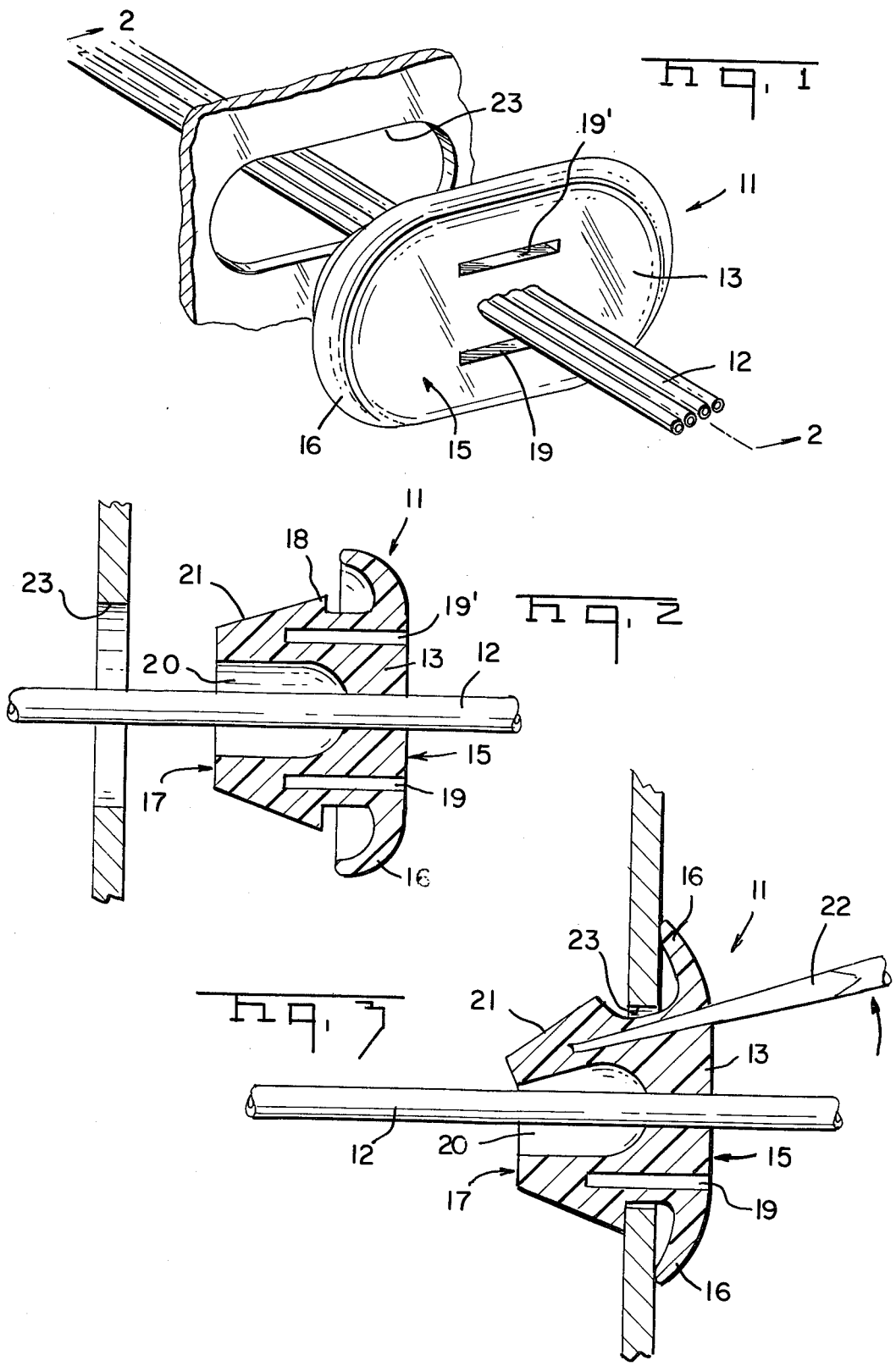

RELEASABLE GROMMET

The invention relates to a grommet for securing a cable in a panel aperture.

Conflicting requirements met when designing grommets intended for use in an adverse environment subject to vibration, for example, when assembled with automotive harnesses, are reliable retention in a panel aperture together with ease of release therefrom to permit inspection, servicing and repair of electrical equipment.

According to the invention, there is provided a grommet having a body of resilient material formed with a laterally extending mounting flange axially spaced from a laterally extending detent shoulder for securing the grommet in an aperture in a panel received beween the mounting flange and detent shoulder and an axially extending socket adjacent the detent shoulder for receipt of a lever-form release tool between a cable, anchored by the grommet, and the detent shoulder.

The adaptation for receipt of a simple release tool such as a screwdriver facilitates ready release from the panel aperture without damage and enables the grommet body to be moulded of a resilient material which is relatively stiff and incompressible assuring reliable retention of the grommet in the panel aperture.

Preferably, the socket opens to a front face of the body adjacent the mounting flange and a stress-relieving cavity is formed in the rear face of the body between the socket and the grommet axis.

The stress relieving cavity facilitates the flexure of the grommet radially inwards at locations adjacent the rear face by pivotal movement of the release tool while permitting structural integrity to be maintained adjacent the front face where the material is relatively incompressible.

The grommet of the invention is particularly suitable for moulding directly on a cable using a durable stiffly resilient reaction injection moulding material such as Mobay 110-07 R.I.M. manufactured by Mobay Chemical Corporation, Penn-Lincoln Parkway West, Pittsburgh, PA. 15205. Thus, releasble grommets can be integrally formed on the cable during harness fabrication both avoiding a need for manipulation of multi-part grommets and ensuring sealing engagement with retention of the cable.

Advantages of using the R.I.M. material are that it is inexpensive and only relatively low pressures are required.

Reference is hereby made to my co-pending application Ser. No. 517,593 of even date, the disclosure of which is incorporated herein by reference.

An example of a grommet according to the invention will now be described with reference to the accompanying drawings in which:

FIG. 1 is a perspective view of the grommet integrally formed directly on a ribbon cable and a portion of a panel having an aperture into which the grommet is to be inserted;

FIG. 2 is a cross-sectional view along line 2—2 of FIG. 1 of the grommet and panel portion shown in FIG. 1; and FIG. 3 is a cross-sectional view of the grommet seated in a panel aperture during use of a release tool.

The grommet 11 is integrally moulded of suitable R.I.M. material directly onto a ribbon cable 12 and has a body 13 with a front face 15, from the periphery of which extends a lateral mounting flange 16 and a rear face 17, adjacent which is a peripheral, laterally extending, detent shoulder 18 axially spaced from the mounting flange. A pair of blind release sockets 19, 19' of restricted width extend axially rearwardly parallel to a cable receiving axis from the front face to a location beyond the detent shoulder, and a stress relieving cavity 20 extends axially forwardly from the rear face between the sockets and the cable to a location axially beyond the shoulder.

The grommet is formed with a tapered surface 21 enabling it readily to be pressed into a panel aperture thereby to anchor the cable extending through the panel. Release of the grommet can be effected readily by inserting a screw driver 22 into a socket and pivoting the free end towards the axis as shown in FIG. 3, to lever the detent shoulder away from a rim 23 of the panel aperture, distortion of the material being facilitated by the cavity 20.

The release feature enables the grommet to be moulded from Mobay 110-07 R.I.M. of about 80 durometer in 10–15 second cycle at relatively low pressure (less than 50 psi). The R.I.M. material remains remarkably tough over a temperature range of $-50°$ F. to $300°$ F. suiting it for automotive use. The grommet is particularly useful in sizes in excess of 25–30 gm weight.

I claim:

1. A grommet having a stiffly resilient body formed with a laterally extending mounting flange axially spaced from a laterally extending detent shoulder for securing the grommet in an aperture in a panel received between the mounting flange and detent shoulder, and a tool receiving socket extending into the body parallel to a cable receiving axis and adjacent the detent shoulder enabling receipt of a straight, lever-form release tool between a cable, anchored by the grommet, and detent shoulder and subsequent pivotal movement of the release tool to withdraw the detent shoulder away from the panel towards the cable axis.

2. A grommet according to claim 1 in which the socket opens to a front face of the body adjacent the mounting flange, and a stress-relieving cavity is formed in the rear face of the body between the socket and the grommet axis.

3. A grommet according to claim 2 which has been formed by moulding directly onto a cable.

4. A grommet according to claim 3 in which the socket extends axially rearwardly beyond the detent shoulder and the cavity extends axially forwardly beyond the detent shoulder.

5. A grommet according to claim 2 in which the socket is blind ended and extends axially rearwardly beyond the detent shoulder and the cavity extends axially forwardly beyond the detent shoulder.

6. A grommet according to claim 1 which has been formed by moulding directly onto a cable.

7. A grommet according to claim 1 in which the socket is of restricted width.

* * * * *